United States Patent [19]

Chun

[11] 4,382,491
[45] May 10, 1983

[54] DRAG FREE DISC BRAKE ASSEMBLY HAVING AUTOMATICALLY ADJUSTING CALIPER

[75] Inventor: Victor L. Chun, Holland, Pa.

[73] Assignee: Hurst Performance, Inc., Warminster, Pa.

[21] Appl. No.: 177,219

[22] Filed: Aug. 11, 1980

[51] Int. Cl.³ .............................................. F16D 65/54
[52] U.S. Cl. ................................. 188/71.8; 188/196 P
[58] Field of Search ................. 188/71.8, 73.45, 196 P

[56] References Cited

U.S. PATENT DOCUMENTS 3,410,371 11/1968 Burnett ............................... 188/71.8
3,500,966 3/1970 Birge ............................. 188/71.8 X

FOREIGN PATENT DOCUMENTS 1550796 11/1968 France ............................... 188/71.8

Primary Examiner—Duane A. Reger
Attorney, Agent, or Firm—Reising, Ethington, Barnard, Perry, Brooks & Milton

[57] ABSTRACT

In a disc brake assembly, one braking pad is associated operatively with a piston, which moves in a cylinder, and another braking pad is associated with a caliper, which is movable together with the cylinder. A first biasing means retracts the braking pads from opposite faces of a disc upon release of hydraulic pressure from a piston. A second biasing means retracts the caliper upon release of such pressure. A drag part, which grips a shaft frictionally, is able to move axially along the shaft, if the force being transmitted by the caliper upon application of such pressure exceeds the force required to energize the second biasing means, so as to compensate for wear of the second braking pad. A limiting means, which cooperates with the drag part so as to limit retraction of the caliper to a fixed distance. In a preferred form, the limiting means comprises a second drag part, which grips the shaft frictionally, which is shorter in its axial length than a given distance between opposite arms of the caliper, and which engages one arm of the caliper, upon retraction of the caliper, so as to limit retraction of the caliper to the fixed distance, which equals the given distance between the arms of the caliper less the axial length of the second drag part.

8 Claims, 8 Drawing Figures

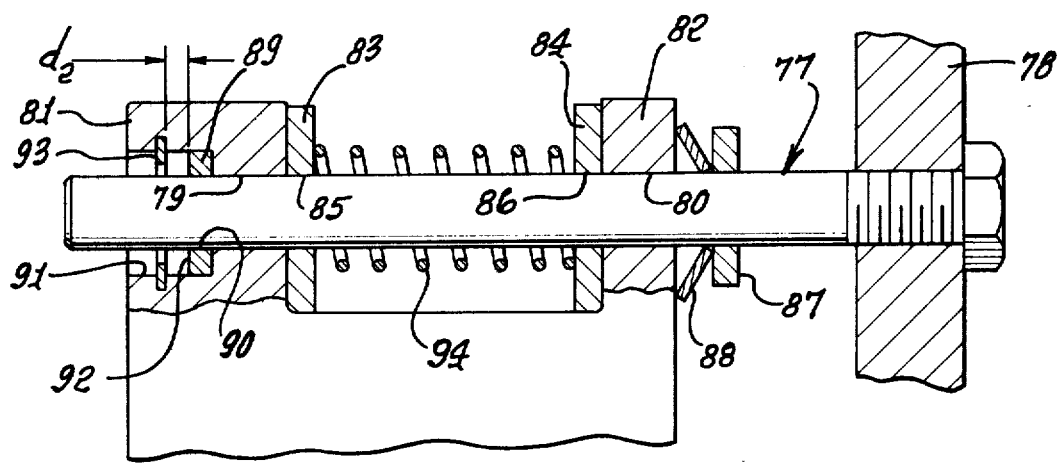
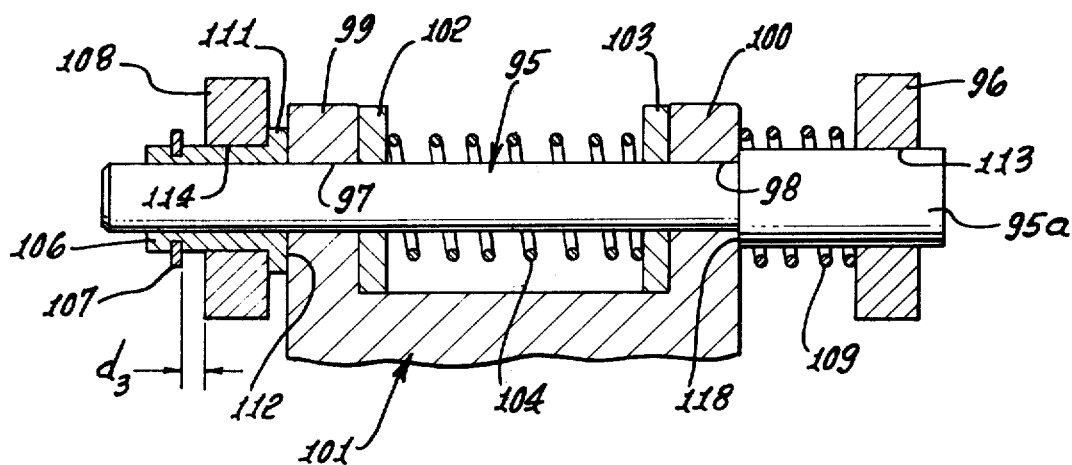
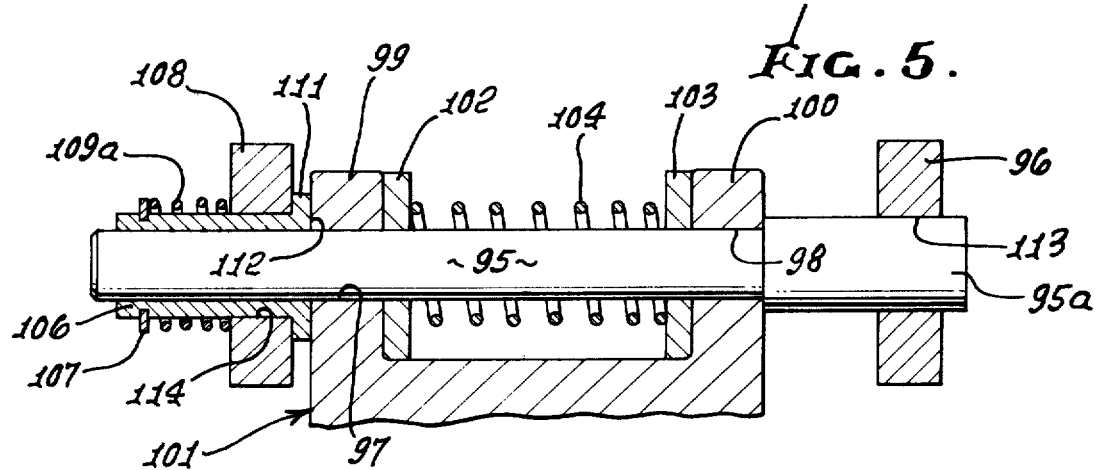

DRAG FREE DISC BRAKE ASSEMBLY HAVING AUTOMATICALLY ADJUSTING CALIPER

BACKGROUND OF THE INVENTION

This invention relates generally to disc brakes, and more specifically concerns the elimination of problems having to do with undesired wear of such brakes on vehicles.

Vehicle disc brake wear may occur when the brakes are not actuated due to the fact that one or both brake pads may come into inadvertant engagement with the rotating disc, such engagement described in "drag". Such wear is undesirable as it requires more frequent replacement of the brake pads. While it is possible to positively retract the pads from the disc, floating calipers on which the pads are usually carried tend to slide back and forth due to inertial forces as the vehicle turns corners while the brakes are not actuated, with the result that the pads come into engagement with the disc and undesired wear results.

U.S. Pat. No. 3,771,625 provides one unique solution to such problems.

SUMMARY OF THE INVENTION

Major objects of the present invention are to eliminate the problems referred to above, and also to improve upon the device of the listed patent so as to provide disc brake structure of unusually advantageous construction and mode of operation, featuring absence of drag in a floating caliper brake unit and also controlled retraction of the caliper. Means is provided to controllably shift the caliper and retain it in a position such that the brake pads remain spaced from the disc when the brakes are not actuated, despite inertial loading on the caliper, and brake wear compensation is effected during brake actuation.

Basically, the invention is embodied in the combination that comprises:
 (a) a caliper adapted to straddle the disc during relative rotation of the disc and caliper, about an axis,
 (b) means on the caliper operable to engage opposite sides of the disc to provide braking,
 (c) shaft structure including at least one shaft extending in the direction of said axis and mounting the caliper for movement lengthwise of the shaft in one direction in response to said operation of said means,
 (d) a return spring positioned to be energized as the caliper is moved in said one direction, and operable to retract the caliper in the opposite direction subsequent to braking operation of said means,
 (e) a first drag part frictionally gripping the shaft for transmitting to the shaft force developed by return spring energization, while remaining capable of being shifted along the shaft in said one direction in response to caliper transmitted force exceeding that required to energize the spring, thereby to compensate for brake wear, and
 (f) a second drag part frictionally gripping the shaft and a stop thereon to limit said retraction of the caliper, said second drag part being positioned to be shifted relatively along the shaft in said one direction in response to caliper movement exceeding that required to energize the spring.

As will appear, the two drag parts may be separated along the shaft, or may be integral; they may comprise rings or sleeves and may be selectively located between caliper arms or outside the space between such arms; the shaft may be fixed relative to mounting bracket structure, or floating relative to such structure.

These and other objects and advantages of the invention, as well as the details of an illustrative embodiment, will be more fully understood from the following description and drawings. Various modifications and changes in details of construction are comprehended within the scope of the appended claims.

DRAWING DESCRIPTION

FIGS. 2-5 are elevations, similar to FIG. 1, but showing modified forms;

DETAILED DESCRIPTION

Figure 1:
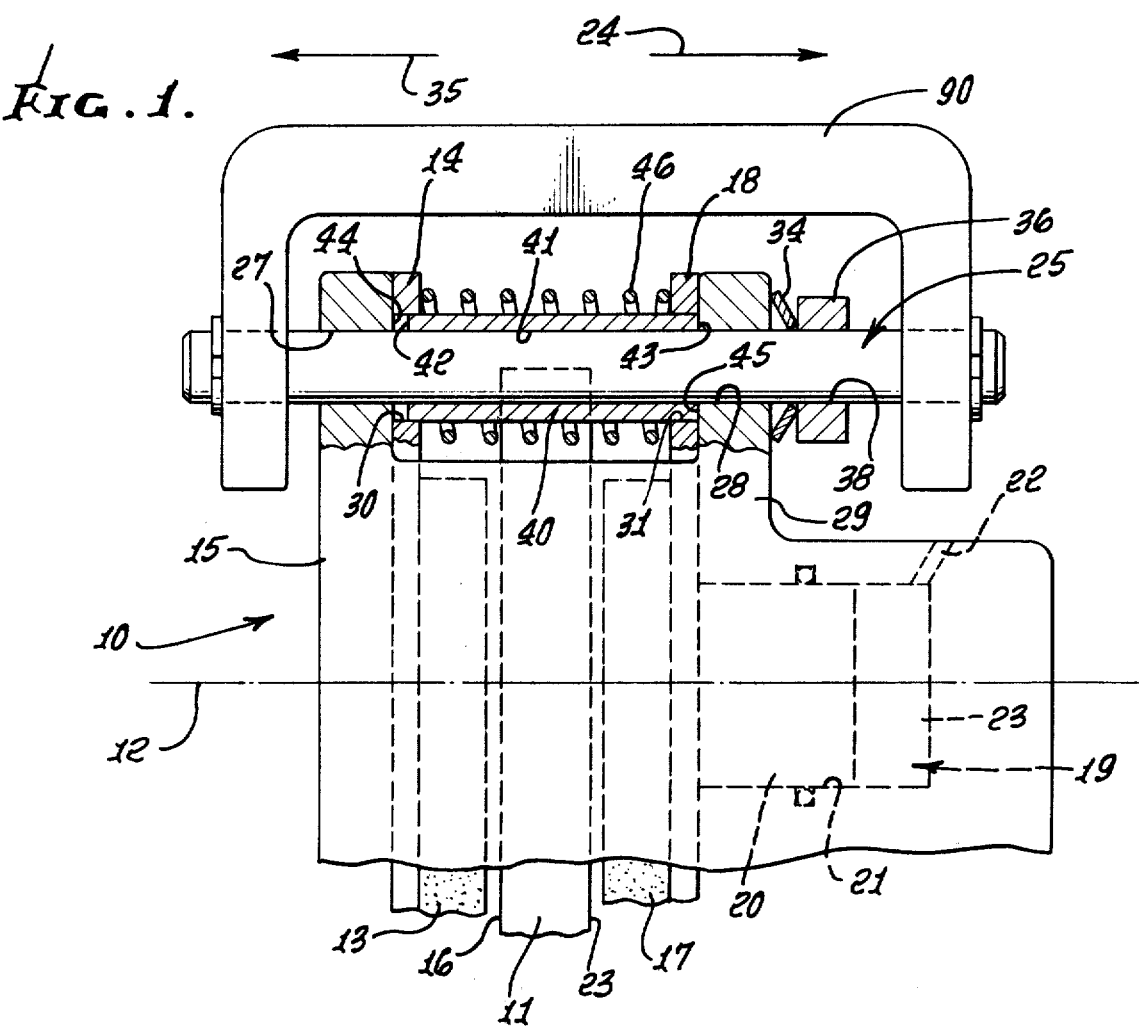
FIG. 1 is a top plan view, taken in section, through a disc brake structure incorporating one form of the invention.

Referring first to FIG. 1, a disc brake assembly includes a caliper 10 straddling a disc 11 which is rotatable about axis 12. A brake pad 13 is carried by plate 14 on arm or element 15 of the caliper and is engageable with side 16 of the disc. Another brake pad 17 is carried by plate 18 which is adapted to be urged by an actuator 19. The latter may be fluid operated and have a piston 20 and cylinder 21 as shown. Fluid pressure admitted at 22 to the cylinder space 23 urges the piston to the left to effect displacement of the pad 17 toward and against the side 23 of the disc. Pads 13 and 17 may be considered as part of the means on the caliper operable to engage opposite sides of the disc, to provide braking.

Shaft structure is provided to extend in the direction of axis 12, and to mount the caliper for movement along the shaft in one direction (see arrow 24, for example) in response to the braking operation. See for example shaft or shafts 25 on which caliper 10 is mounted to slide. The shaft is typically fixed, and attached to mounting structure shown for example at 90, and which is integral with a vehicle frame. The shaft passes through bearing openings 27 and 28 in caliper parts or arms 15 and 29. Plates 14 and 18 also define openings 30 and 31 (but larger than the shaft diameter) to pass the shaft. The caliper typically slides along the shaft in direction 24 in response to movement of pad 17 to the left to engage the disc, such movement resulting in caliper movement to cause pad 13 to be brought into engagement with side 16 of the disc.

A return spring 34, as for example a Belleville spring as shown, is positioned to be energized as the caliper is moved in direction 24, the spring typically being compressed. Upon brake release, the compressed spring is operable to urge and displace the caliper a small amount in a retraction direction (see arrow 35), whereby pad 13 is displaced away from the disc so as not to drag thereon.

The spring is enabled to function in this manner due to its confinement between caliper part 29 and a first drag part (such as drag ring 36), the spring being annular and extending about shaft 25, as shown. Drag part 36 frictionally grips the shaft at annular interface 38 for transmitting to the shaft the force developed by energization of the spring. At the same time, its frictional interfit at 38 is such as to enable the ring 36 to be forcibly shifted along the shaft in direction 24 in response to caliper transmitted force exceeding that required to energize the spring, thereby to compensate for brake wear. Thus, during brake application, should brake pad wear result, with forcible caliper movement to the right by a small amount greater than the displacement required to fully energize the spring, the drag ring will be pushed to the right on the shaft by a corresponding amount.

Also provided is a second drag part (as for example sleeve 40 on the shaft 25) frictionally gripping the shaft and providing a stop to limit retraction of the caliper in direction 35. The second drag part 40 typically has a frictional interfit with the shaft at their interface 41. Note that the sleeve 40 has opposite ends 42 and 43 which are alternately engageable by the opposed shoulders 44 and 45 respectively in the caliper parts or arms 15 and 29. The spacing of sleeve ends 42 and 43 is less than the spacing between shoulders 44 and 45, so that two functions are served. The first function is for caliper shoulder 45 to engage the sleeve end 43 to limit retraction of the caliper, as described. At this time the spring 34 is typically only partly compressed. The second function is for caliper shoulder 44 to engage sleeve end 42 to be shifted along the shaft in the direction of arrow 24, in response to caliper movement exceeding that required to compress the spring 34, as described above. This shifts the sleeve to the right, on the shaft, at the same time that drag ring 36 is shifted to the right as described above.

Note that the opposite end portions of the sleeve are slidably secured in openings 30 and 31 in the plates, to center or position those plates, relative to shaft 25. A helical spring 46 extends about the sleeve and acts against the plates 14 and 18 to urge them against the caliper arm faces 44 and 45, whereby the brake pads are maintained at a wider spacing or gap than the width of the disc, during retraction mode.

Figure 2:
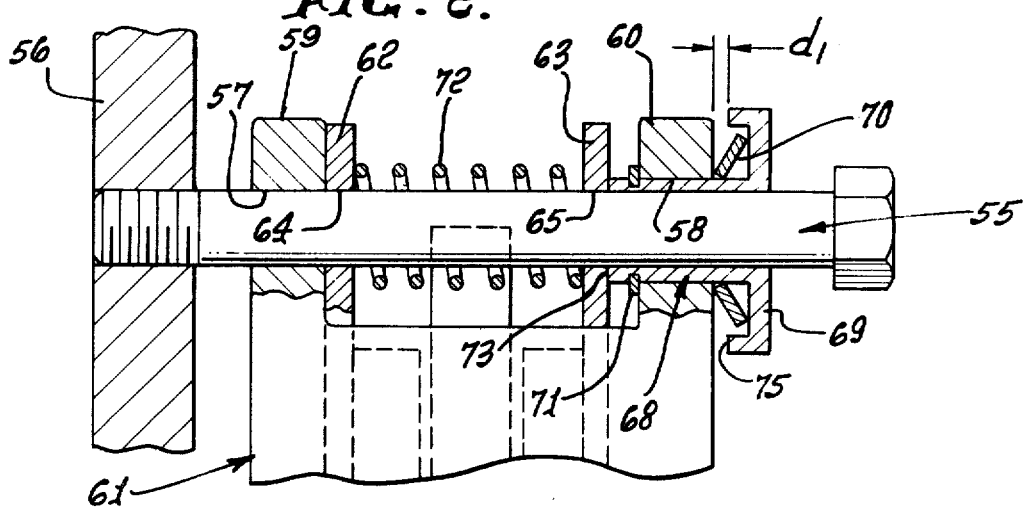

In FIG. 2 the shaft 55 fixed to structure 56 and passes through openings 57 and 58 in arms 59 and 60 of caliper 61. Plates 62 and 63 (corresponding to plates 14 and 18) also have openings 64 and 65 passing the shaft so that the plates may slide along the shaft with the caliper arms.

The second drag part is defined by a tubular sleeve 68 having frictional interfit with the shaft, and corresponding to sleeve 40 described above. Sleeve 68 is, however, outside the space between arms 59 and 60, and it is integral with the first drag part or ring 69, as shown. Sleeve 68 passes through caliper arm opening 58, and that arm is freely slidable on the sleeve. A Belleville return spring 70 is positioned between drag ring 69 and the caliper arm 60, as in FIG. 1. A stop ring 71 is carried on the sleeve 68 to limit leftward retraction of caliper arm 60, subsequent to braking (which carries caliper arm 60 to the right, to compress return spring 70).

A helical spring 72 about the shaft and between plates 62 and 63 urges plate 62 against arm 59, and urges plate 63 against the left end 73 of sleeve 68.

When the caliper 61 is moved to the right beyond the amount "$d_1$"(the gap between arm 60 and left shoulder 75 on ring 69) that ring and the sleeve 68 are both forcibly displaced to the right, on the shaft, to compensate for brake wear.

Referring now to FIG. 3, the shaft 77 is fixed to structure 78 and passes through openings 79 and 80 in caliper arms 81 and 82. Plates 83 and 84 (corresponding to plates 14 and 18) also have openings 85 and 86 passing the shaft so that such plates may slide along the shaft with the caliper arms.

The first drag part is defined by drag ring 87 having frictional interfit with the shaft, and corresponding with first drag ring 36 described above.

Return Belleville spring 88 corresponds to spring 34 in FIG. 1.

The second drag part is defined by annulus 89 having frictional interfit with the shaft 77, which extends through the annulus. See opening 90 in that annulus. The annulus is received in a recess 91 in caliper arm 81. When the caliper is moved to the right beyond the amount "$d_2$"(the gap between left shoulder 92 on annulus 89 and the right side shoulder of ring 93 carried by the arm 81), that annulus and Belleville spring 88 are both forcibly shifted to the right, on the shaft, to compensate for brake pad wear. On retraction, the annulus 89 limits leftward movement of the caliper so that spring 88 remains at least partly energized. Spring 94 urges plates 83 and 84 against arms 81 and 82, respectively.

Referring to FIG. 4, the shaft 95 is fixed to bracket arm 96, and passes through openings 97 and 98 in arms 99 and 100 of caliper 101. Plates 102 and 103 correspond to plates 14 and 18, and have openings through which shaft 95 passes. Spring 104 urges the plates against the caliper arms.

The first drag part is defined by sleeve 106 having frictional interfit with the shaft, and corresponding to drag ring 36 in FIG. 1; thus, when the caliper (and shaft 95) are displaced to the right beyond amount "$d_3$", retaining ring 107 on drag sleeve 106 engages the fixed bracket 108, and shaft 95 is moved further to the right, frictionally slipping in drag sleeve 106. Note that caliper arm 100 engages shaft step shoulder 118 to displace the shaft to the right, during this movement. Return spring 109 between bracket 96 and caliper arm 100 urges the caliper to the left, for retraction.

The second drag part frictionally gripping the shaft comprises annulus 111, which here is integral with sleeve 106. Stop 112 on part 111 limits said retraction of the caliper. Shaft enlargement 95a is slidable in opening 113 in bracket 96; and sleeve 106 is slidable in opening 114 in bracket 108.

The structure seen in FIG. 5 is the same as in FIG. 4 (corresponding elements bearing the same numbers) except that the return spring 109a is here located between retaining ring 107 and bracket 108. Functioning is the same as in FIG. 4.

Figure 6:
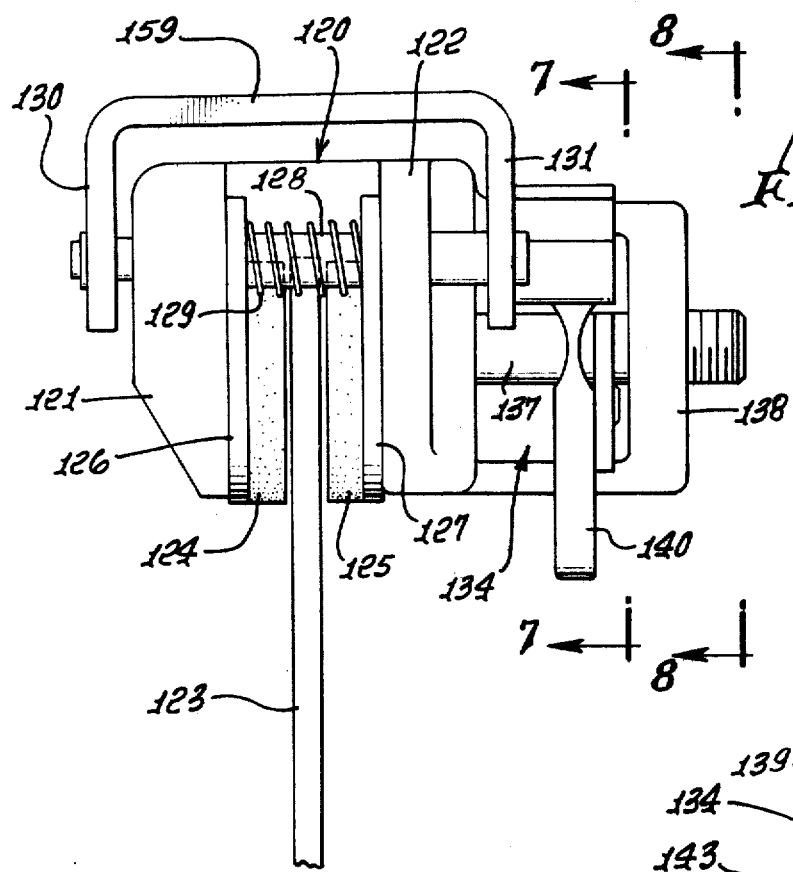
FIG. 6 is an elevation showing a brake assembly which may incorporate any of the FIGS. 1-5 variations.
Figure 7:
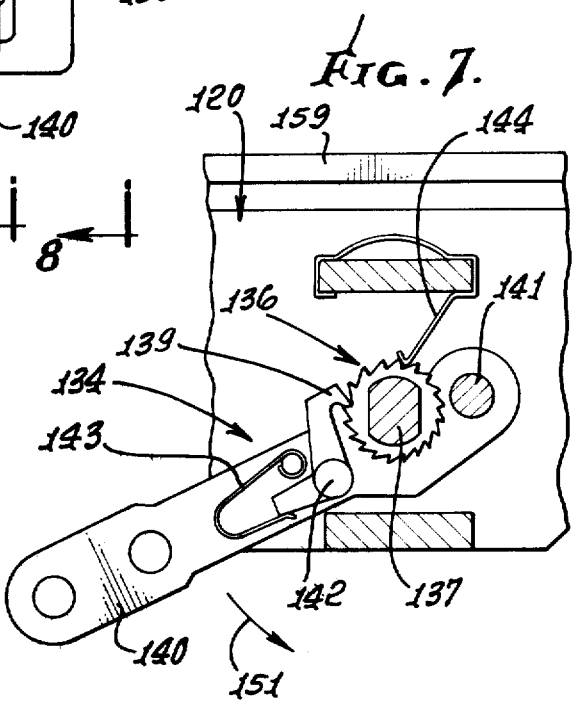
FIG. 7 is a section on lines 7—7 of FIG. 5.
Figure 8:
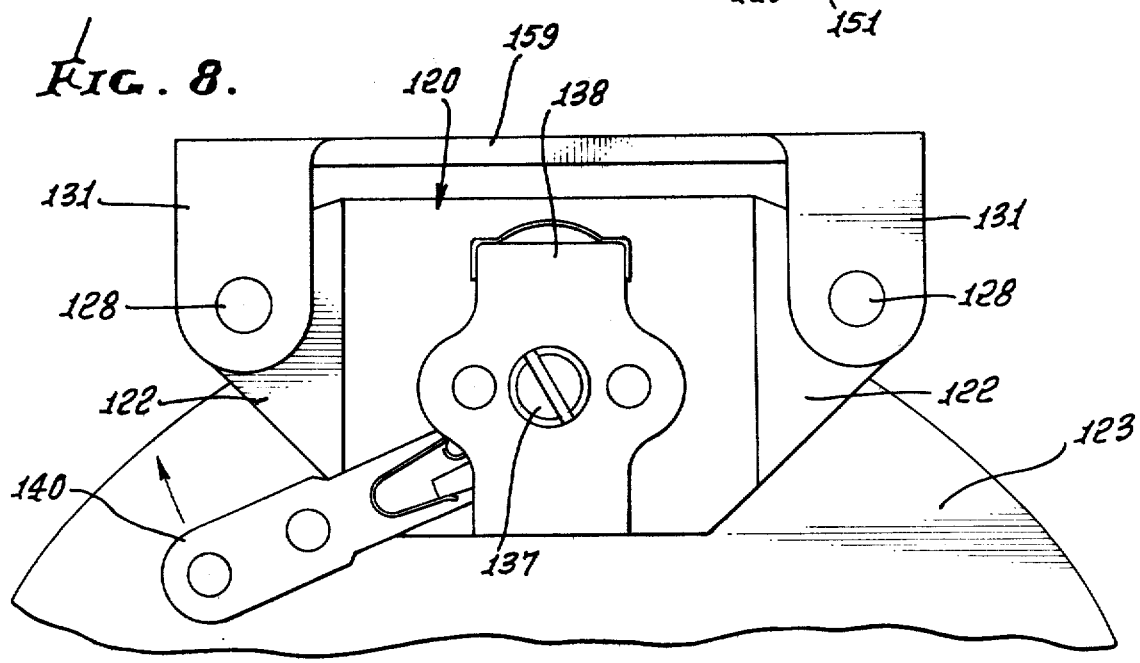
FIG. 8 is an end elevation taken on lines 8—8 of FIG. 6.

FIGS. 6, 7 and 8 show a disc brake assembly in which any of the forms of the invention described in FIGS. 1–5 may be incorporated. The caliper 120 shown has arms 121 and 122; the disc is shown at 123 between brake pads 124 and 125, and plates 126 and 127 mount the pads. The plates and arms are slidable on shaft 128. Spring 129 urges the plates against the arms. Bracket 159 has arms 130 and 131 embracing the opposite ends of the shaft.

Actuator structure to adjustably displace plate 122 and pad 125 toward disc 123 is shown at 134 in FIG. 7. Mechanical means to adjust the actuator plunger toward brake applied position (to further compensate for brake pad wear) includes a ratchet mechanism shown in FIG. 7. As illustrated, a ratchet wheel 136 on plunger 137 (which is thread connected to housing structure 138) is engaged by pawl 139. Arm 140 pivoted at 141 carries the pawl via pivot 142, and a spring 143 urges the pawl toward the ratchet wheel teeth. As the arm 140 is rotated in the direction of arrow 151, wheel 136 and plunger 137 are rotated, to adjust (take-up) the brake. A detent 144 prevents engaging the wheel teeth to prevent reverse rotation of the ratchet wheel.

Thus, operation of the ratchet and pawl mechanism serves to selectively advance the plunger 137, which coacts with a brake actuator (as for example is shown in FIG. 1) to displace the actuator for effectively moving the brake pads relatively toward one another (to compensate for brake pad wear. Shaft 137 is threaded to part 138.

FIG. 8 shows two parallel shafts 128 along which caliper arms are relatively slidable; and accordingly, the devices of FIGS. 1-5 may each incorporate two such parallel shafts.

I claim:

1. A disc brake assembly comprising
   a fixed shaft, which defines an axis,
   a disc, which is rotatable about an axis parallel to the axis of the shaft, and which has opposite first and second faces,
   a first braking pad, which is movable axially along the shaft into and out of frictional engagement with the first face of the disc,
   a second braking pad, which is movable axially along the shaft into and out of frictional engagement with the second face of the disc,
   hydraulic means, which comprises a cylinder movable axially along the shaft and a piston movable axially in the cylinder, which moves the first braking pad a sufficient distance axially, regardless of the amount of wear on the first braking pad, to effect frictional engagement with the first face of the disc upon application of hydraulic pressure to the piston, and which allows the first braking pad to move axially out of frictional engagement with the first face of the disc upon release of hydraulic pressure from the piston,
   a caliper, which straddles the respective braking pads and the disc, and which is movable axially along the shaft, together with the cylinder, so as to move the second braking pad axially into frictional engagement with the second face of the disc in reaction to application of hydraulic pressure to the piston, and so as to allow the second braking pad to move axially out of frictional engagement with the second face of the disc upon release of hydraulic pressure from the piston,
   a first biasing means, which biases the respective braking pads so as to oppose axial movement of the respective braking pads into frictional engagement with the respective faces of the disc upon application of hydraulic pressure to the piston, and so as to cause axial movement of the respective braking pads out of frictional engagement with the respective faces of the disc upon release of hydraulic pressure from the piston,
   a drag part, which grips the shaft frictionally,
   a limiting means, which cooperates with the drag part so as to limit retraction of the caliper to a fixed distance, and
   a second biasing means, which allows the caliper to move the second braking pad axially into frictional engagement with the second face of the disc in reaction to application of hydraulic pressure to the piston, whereby the second biasing means is energized, and which retracts the caliper upon release of hydraulic pressure from the piston,
   wherein the drag part is able to move axially along the shaft, if the force being transmitted by the caliper to the drag part through the second biasing means upon application of hydraulic pressure to the piston exceeds the force required to energize the second biasing means, so as to compensate for wear of the second braking pad.

2. The disc brake assembly of claim 1 wherein the drag part, with which the limiting means cooperates, is a first drag part, wherein the caliper has opposite arms, which straddle the respective braking pads and the disc, and which are spaced axially from each other by an axial distance therebetween, wherein the limiting means comprises a second drag part, which grips the shaft frictionally, which is movable axially along the shaft in response to a force of sufficient magnitude, and which is shorter in its axial length than the axial distance between the arms of the caliper, which is able to move axially along the shaft when the first drag part is able to move axially along the shaft, and which engages one arm of the caliper, upon retraction of the caliper, so as to limit retraction of the caliper to the fixed distance, which equals the axial distance between the arms of the caliper less the axial length of the second drag part.

3. The disc brake assembly of claim 1 wherein the second drag part is located between the arms of the caliper.

4. The disc brake assembly of claim 1 wherein the second biasing means and the second drag part are disposed beyond the arms of the caliper at opposite sides of the caliper.

5. A disc brake assembly comprising
   a fixed support,
   a shaft, which defines an axis, which has a shoulder at one end, and which is supported by the support so as to allow the shaft to move axially,
   a disc, which is rotatable about an axis parallel to the axis of the shaft, and which has opposite first and second faces,
   a first braking pad, which is movable axially along the shaft into and out of frictional engagement with the first face of the disc,
   a second braking pad, which is movable axially along the shaft into and out of frictional engagement with the second face of the disc,
   hydraulic means, which comprises a cylinder movable axially along the shaft and a piston movable axially in the cylinder, which moves the first braking pad a sufficient distance axially, regardless of the amount of wear on the first braking pad, to effect frictional engagement with the first face of the disc upon application of hydraulic pressure to the piston, and which allows the first braking pad to move axially out of frictional engagement with the first face of the disc upon release of hydraulic pressure from the piston,
   a caliper, which straddles the respective braking pads and the disc, and which is movable axially along the shaft, together with the cylinder, so as to move the second braking pad axially into frictional engagement with the second face of the disc in reaction to application of hydraulic pressure to the piston, and so as to allow the second braking pad to move axially out of frictional engagement with the second face of the disc upon release of hydraulic pressure from the piston, a first biasing means, which biases the respective braking pads so as to oppose axial movement of the respective braking pads into frictional engagement with the respective faces of the disc upon application of hydraulic pressure to the piston, and so as to cause axial movement of the respective braking pads out of frictional engagement with the respective faces of the disc upon release of hydraulic pressure from the piston, a drag part, which grips the shaft frictionally near the end opposite to the end having the shoulder, a limiting means, which cooperates with the drag part so as to limit retraction of the caliper to a fixed distance, a second biasing means, which allows the caliper to move the second braking pad axially into frictional engagement with the second face of the disc in reaction to application of hydraulic pressure to the piston, whereby the second biasing means is energized, and which retracts the caliper upon release of hydraulic pressure from the piston, wherein the caliper engages the shoulder of the shaft, whereupon the caliper moves the shaft axially and the drag part is able to move axially along the shaft, if the force being transmitted by the caliper upon application of hydraulic pressure to the piston exceeds the force required to energize the second biasing means, so as to compensate for wear of the second braking pad.

6. The disc brake of claim 5 wherein the limiting means comprises a shoulder on the drag part and a retaining ring seated in a groove in the drag part and wherein the shoulder on the drag part and the retaining ring cooperate with the fixed support to as to limit retraction of the caliper to the fixed distance.

7. The disc brake assembly of claim 5 or 6 wherein the second biasing means is disposed so as to act between the fixed support and the caliper.

8. The disc brake assembly of claim 5 or 6 wherein the second biasing means is disposed so as to act between the retaining ring and the fixed support.

* * * * *